March 10, 1936. J. M. WALTER 2,033,749
MILLING MACHINE HEAD
Filed Feb. 2, 1934 4 Sheets-Sheet 2

INVENTOR.
John M. Walter

March 10, 1936.  J. M. WALTER  2,033,749
MILLING MACHINE HEAD
Filed Feb. 2, 1934  4 Sheets-Sheet 3
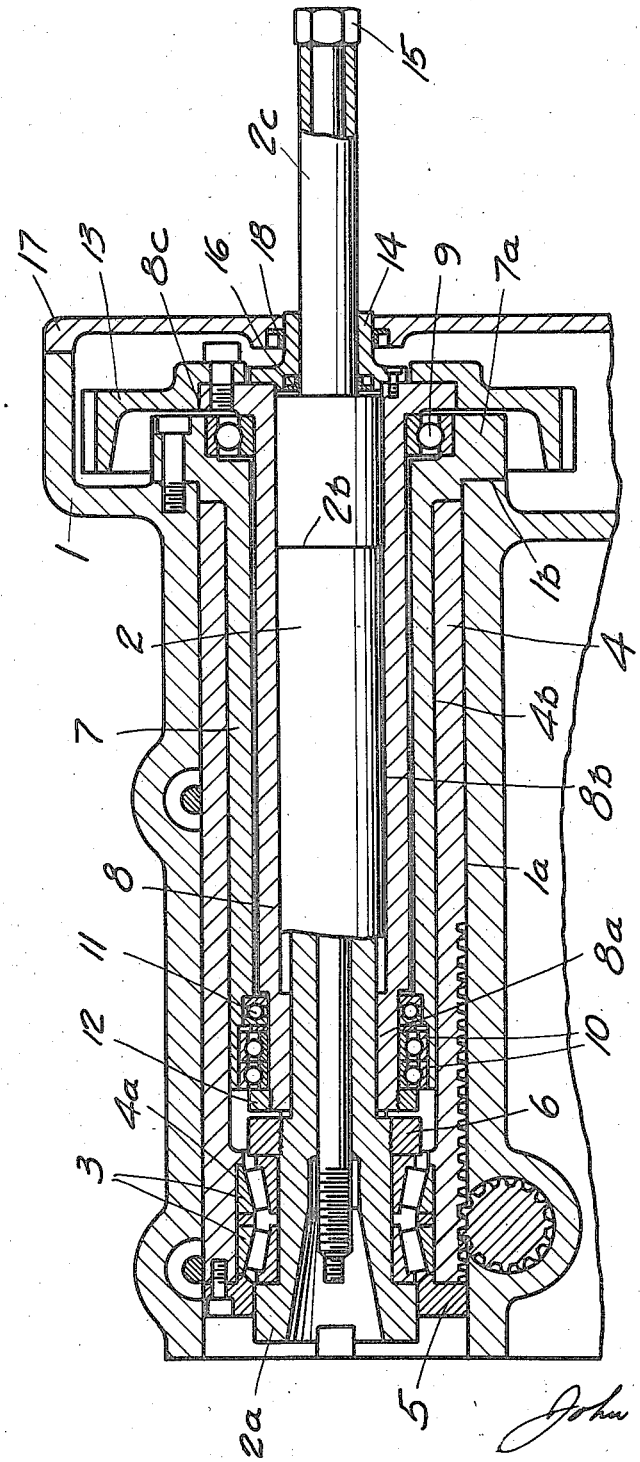
INVENTOR.
John M. Walter

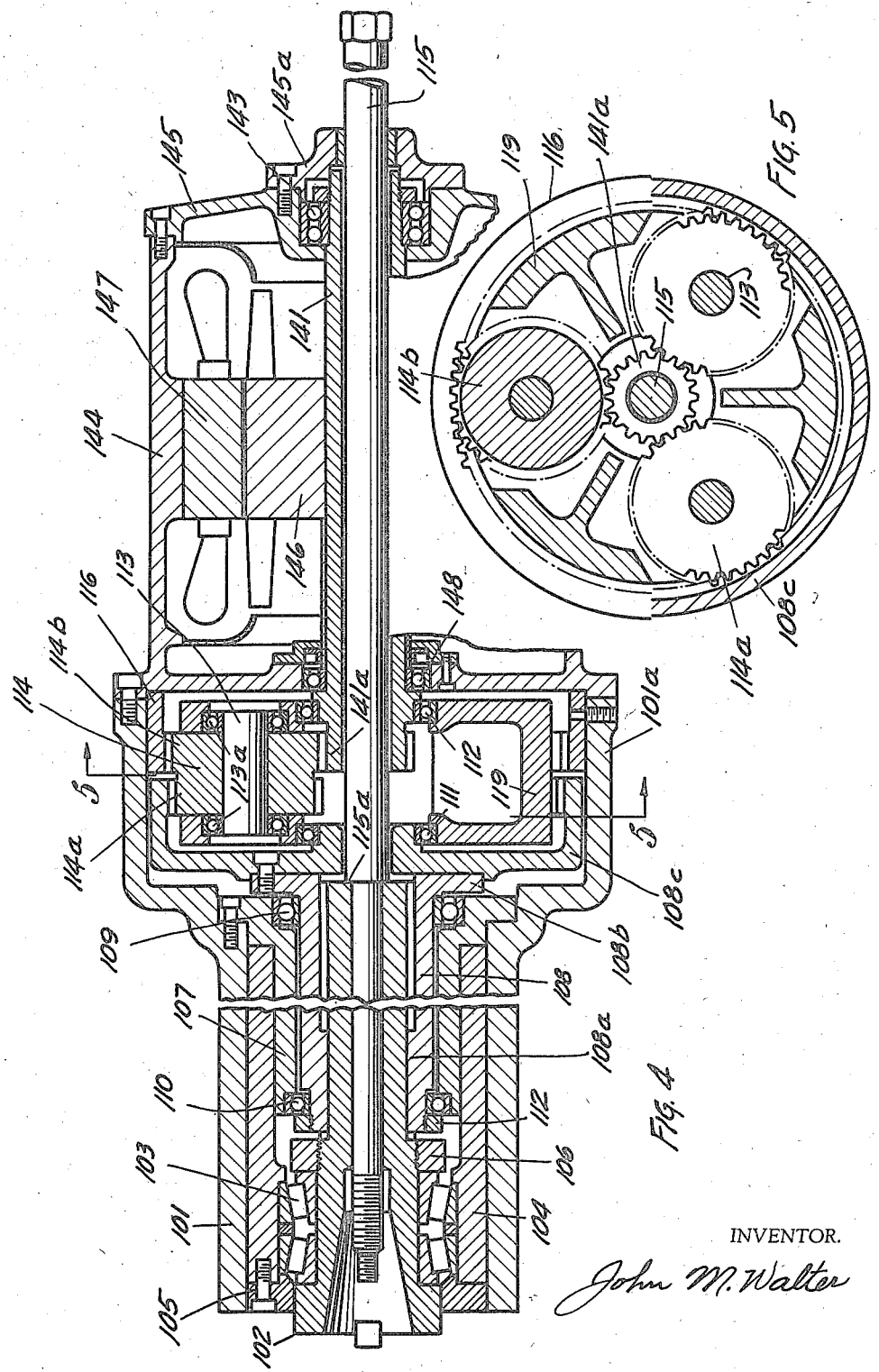

Patented Mar. 10, 1936

2,033,749

UNITED STATES PATENT OFFICE 2,033,749

MILLING MACHINE HEAD

John M. Walter, Cincinnati, Ohio, assignor to The G. A. Gray Company, Cincinnati, Ohio Application February 2, 1934, Serial No. 709,495

15 Claims. (Cl. 90—14)

My invention consists of a method of mounting and driving a rotating spindle to which milling cutters or other tools may be attached. The mechanism is compact, is so arranged as to minimize torsional deflection in the spindle, is readily driven by an electric motor mounted on the head, and is so arranged that different spindle speeds may be easily and quickly obtained. The driving motor, speed changing mechanism, and the spindle are embodied in a compact and self-contained unit so that this invention is applicable whenever it is desired to use a milling cutter, or other rotating tool, on any type of machine tool. Hitherto, the several functions performed by this head have usually been separated in different parts of the machine, which is often a disadvantage and results in a considerable loss of power. Also, the conventional design is more bulky and clumsy than the arrangement which I have invented.

Since the unit is self-contained, it may be readily swivelled to any desired angle, for angular milling with face milling or slab milling cutters, and may be readily demounted from, or remounted on, any part of the machine on which it is to be used.

Figure 1:
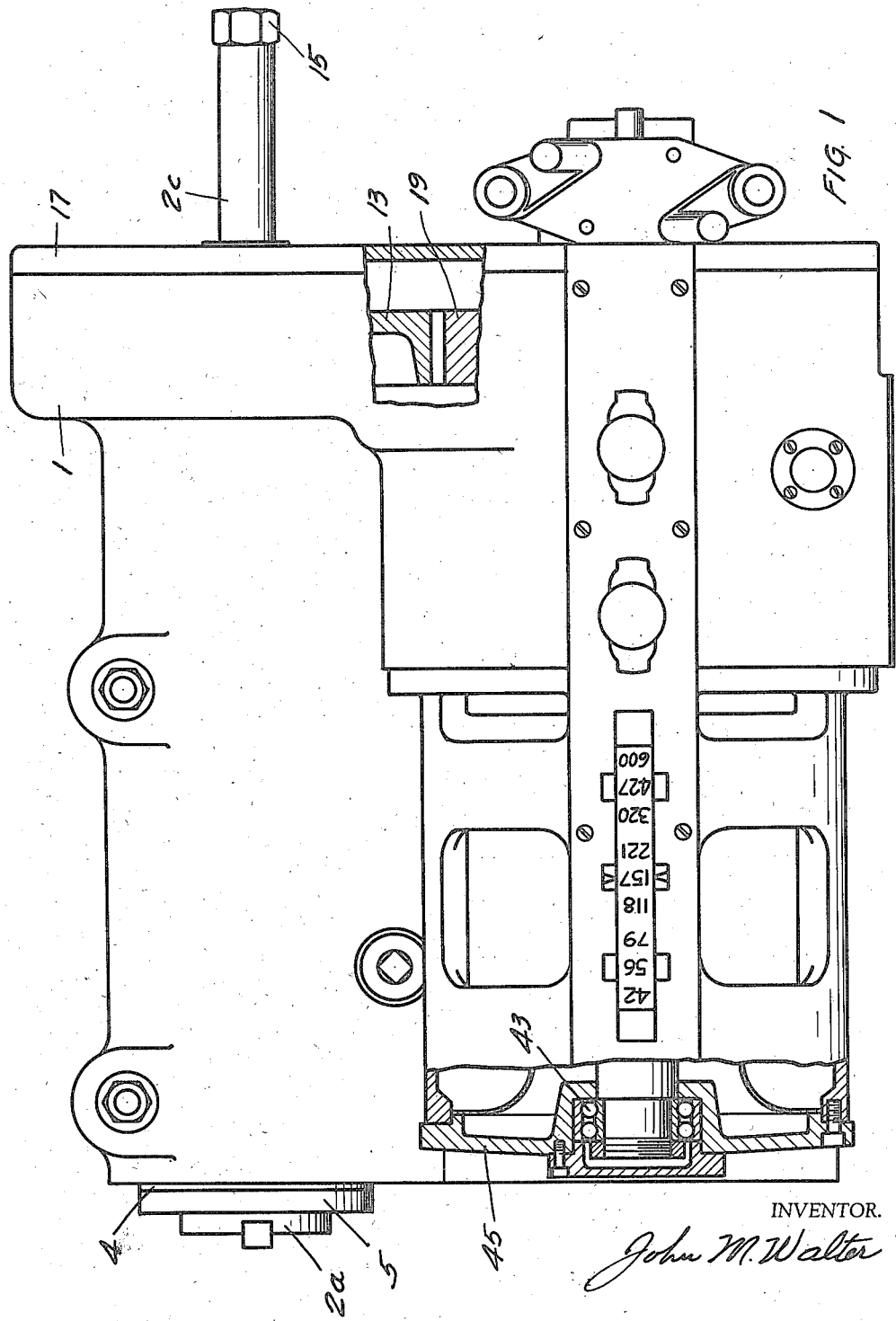
Figure 2:
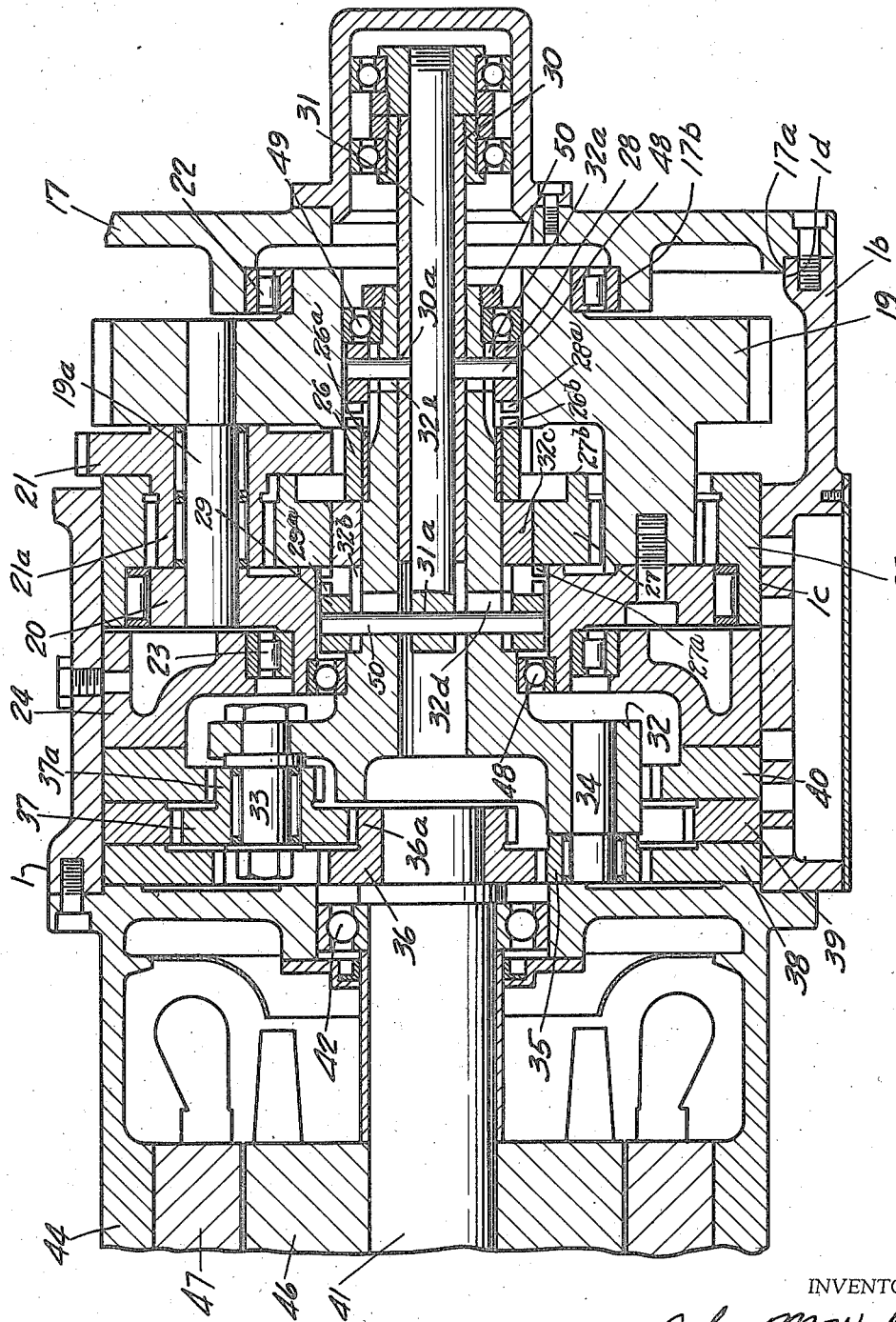

In the drawings, Fig. 1 is a front view of a first form of my milling head, cut away to show parts of two meshing gears; Fig. 2 is an axial section through the motor shaft and planetary gearing whereby speed changes are obtained; Fig. 3 is an axial section through the milling spindle, with a part of the hollow spindle not sectioned; Fig. 4 is an axial section through a specialized form of my milling head, with a part of the motor section omitted to make room for Fig. 5; and Fig. 5 is a transverse section of Fig. 4 on line AB.

In order to simplify the description of the mechanism, it will be assumed throughout the description that the spindle is horizontal, and that the spindle nose to which the milling cutter is attached is at the left. This is the outer end of the spindle.

In the drawings, 1 is a cast iron body or case which may be a fixed member, a sliding member, or be bolted to a fixed member or to a saddle or sliding member, or be adapted to swivel upon such a saddle or sliding member, in a manner already well known in the art. In this case is enclosed the greater part of the mechanism. Referring now to Fig. 3, 2 is a hollow spindle having a spindle nose 2—a to which may be attached a milling cutter or other tool suitable for the work to be done. Spindle 2 is mounted as closely as possible to the nose in a pair of preloaded anti-friction bearings 3. I prefer these bearings to be of the tapered roller type, in which the rollers are self aligning. The races of these bearings fit a counterbore in quill 4, the outer races being clamped between the shoulder of the counterbore, 4—a, and a flange 5 which is attached to quill 4 by means of screws.

The preloading is accomplished by nut 6 which is threaded to the spindle, and which abuts against the inner race of one of the bearings, the inner race of the other bearing abutting against the spindle nose 2—a. Concentric with the spindle and the quill is a hollow cylinder 7 which forms a bearing support, having a flange 7—a by means of which it is bolted to the case 1, the flange abutting against a machined surface of the case, 1—b, and fitting the bore 1—a of the case in the manner shown, in order to assure concentricity. Within the hollow cylinder 7 is a hollow shaft 8 which serves to drive the spindle by means of two keys 8—a formed integrally with the hollow shaft 8 and sliding in keyways which extend from the right-hand end of the spindle 2 to the threaded portion upon which the nut 6 is threaded. The hollow shaft 8 is provided with a flange 8—c and turns in preloaded ball bearing 9 and two preloaded ball bearings 10. Since the ball bearings 10 are necessarily much smaller than 9, and incapable of carrying as great a load, I use two of them and provide a ball thrust bearing 11. The two ball bearings 10 are preloaded by clamping them between thrust bearing 11, and nut 12, which is threaded to hollow shaft 8. The preload for ball bearing 9 is supplied by tightening nut 12 until the load on thrust bearing 11 gives a suitable preload to ball bearing 9. Should bearings of suitable load bearing capacity, and of the same bore and outside diameter as ball bearing 10 be available for the service imposed on the milling head, only one bearing 10 need be used, and thrust bearing 11 may be omitted, in which case a single bearing 10 would oppose and preload bearing 9.

The quill 4 is ground, or otherwise machined to be a snug sliding fit in the smooth bore 1—a of case 1. The right-hand end of the bore of quill 4 is ground, or otherwise smoothly finished, so that it will be a smooth sliding fit on the ground exterior surface of hollow cylinder 7. By this means, both the right-hand end of cylinder 7, which fits in bore 1—a, and the left-hand end, which fits in bore 4—b, are supported when the quill is moved to the left, carrying the spindle with it.

In order to support the right-hand end of the spindle, hollow shaft 8 has a ground or otherwise smoothly finished bore 8—b at the right-hand end, and a few inches of the exterior surface of the right-hand end of the spindle 2 are finished to be a snug sliding fit in bore 8—b. In order to avoid undue friction, that portion of spindle 2 lying between nut 6 and line 2—b are made a few thousandths of an inch smaller than bore 8—b, and from line 2—b to the right-hand end of the spindle, its cylindrical surface is carefully ground to fit the bore.

It will thus be seen that as the quill is moved toward the left, its bore serves to support the left-hand end of the hollow cylinder 7 so that the bearings 10 will remain concentric with the axis of the bore 1—a, preventing the deflection of the hollow shaft 8. Also, the right-hand end of the spindle 2 will remain concentric with the preloaded bearings 9 and 10, and be guided as the spindle advances to the left.

Since the hollow shaft extends close to the nut 6, the spindle is driven at a point as close to the nose as possible. When the quill is at its right-hand position, the length of the spindle subjected to torque is a minimum, and by this means I greatly reduce the torsional deflection and resulting chatter. As the quill and spindle are moved to the left, the length of spindle subject to torsion increases, but the length is always the minimum length possible in the case of a spindle movable axially and contained in a quill.

Bolted to the hollow shaft 8 is gear 13, which revolves in an enlarged portion of the right-hand end of case 1, and meshes with gear 19 which also revolves in the same enlarged portion. Gear 19 is best shown in Fig. 2, and portions of gears 13 and 19 are shown meshing together in Fig. 1 where a part of the enlarged portion of case 1 is cut away. Gear 19 serves to drive the gear 13 whereby rotation is imparted to the hollow shaft and the spindle.

Integral with the spindle and at the right-hand end is a hollow cylindrical extension 2—c. If desired, the right-hand end of the spindle may be counterbored and the extension 2—c made a separate piece and pressed into the counterbore. Bolted to the hollow shaft 8 is a flange 14 of the form shown. The spindle extension 2—c is made of such a length that its right-hand end is flush with the end of flange 14 when the spindle and quill are moved as far as possible to the left.

Through the hollow spindle and its extension 2—c can be passed a draw bolt 15, to which may be screwed the tapered portion of a cutter or arbor which fits the nose 2—a of the spindle. By turning draw bolt 15, the cutter or arbor may be drawn snugly into place.

In order to retain oil and to prevent the entrance of dirt into the space in which the gears and bearings are contained, a packing 16 is provided, which fits the extension 2—c. In like manner, packing 18, which fits in cover 17, retains oil and prevents the entrance of dirt around the exterior surface of flange 14. It will be understood that the spindle 2, its extension 2—c, hollow shaft 8, flange 14, packing 16 and draw bolt 15 all turn together, so that there is sliding motion only between the surface of 2—c and packing 16. On the other hand, since cover 17 is stationary, and flange 14 does not move axially, there is rotation only between the surface of flange 14 and packing 18.

Referring now to Fig. 2, parallel with the bore 1—a of case 1, and separated therefrom by a wall of metal, is bore 1—c. The enlarged right-hand end 1—b of case 1 is counterbored concentric with bore 1—c at 1—d, this counterbore not being a complete circle. On the cover 17, which is faced to be bolted against the right-hand end of case 1, is turned a cylindrical portion 17—a which fits the counterbore 1—d. Concentric with this cylindrical portion 17—a is bored a hole 17—b in which fits the outer race of roller bearing 22.

Gear 19 acts as a planet plate, in which are fixed three studs 19—a, the other ends of the studs fitting in member 20 which is bolted to gear 19. On each stud revolves a planet gear 21 which is driven by a sun pinion 26. The extended hub of each planet gear 21 is toothed to form planet pinion 21—a which meshes with sun gear 27. Each of the three planet pinions 21—a also meshes with internal gear 25, which is free to revolve in bore 1—c, but which can be restrained from revolving by inserting a poppet through a hole in case 1 in such a manner as to engage a hole or notch formed on the exterior surface of ring gear 25. The method of obtaining a plurality of speeds from a planetary gear system having a plurality of ring gears normally free to revolve, by restraining any one or more of these ring gears, is more fully disclosed in co-pending application 669,581 filed May 5, 1933. The planet carrier assembly consisting of gear 19, member 20, three studs 19—a, and three planet gears 21, rotate in two roller bearings 22 and 23. Roller bearing 22, as already explained, is concentric with bore 1—c, and supported by cover 17, and roller bearing 23 is supported in a bored hole in member 24 which is fast in bore 1—c.

It will be noted that all the gears mentioned are concentric with bore 1—c or else their axes generate circular cylinders concentric with this bore, the axes describing circular paths about the common axis of the other gears and the bore 1—c.

Sun pinion 26 is lined by bushing 26—a which turns freely on the smooth outer surface of member 32. Sun gear 27 turns freely on the outside of a bronze bush 32—c which is pressed onto member 32. Sun pinion 26, while free to turn on member 32, is restrained from having appreciable axial motion to the right by contact of the ends of its teeth with a finished surface of gear 19, and to the left by the end of bushing 32—c. Sun gear 27, which is provided with annular extension 27—b, is likewise restrained axially by the three planet gears, and a faced surface on member 20.

Member 32 is a second planet plate having an extended hub, which is hollow and turns on ball bearing 49, the outer race of which is seated in gear 19, and ball bearing 48, the outer race of which is seated in member 20. On planet plate 32 at 32—a, are cut splines which engage corresponding splines in clutch 28. At 32—b are cut splines which engage corresponding splines in clutch 29. The inner race of ball bearing 48 is pressed onto the hub of planet plate 32, and the inner race of ball bearing 49 is held in place on the other end of the same hub by nut 50, which is threaded to the end of the hub.

Sliding in the bore of planet plate 32 is a tube 30 in which are drilled two holes 30—a. Corresponding holes are drilled in clutch 28 and into these holes are pressed two pins 48 which, passing through slots 32—e in planet plate 32, enter the holes 30—a in tube 30. By shifting the tube axially, clutch 28 may be shifted toward and away from planet pinion 26.

Planet pinion 26 is provided with clutch teeth 26—*b*, and clutch 28 is provided with clutch teeth 28—*a* so that when tube 30 is moved axially to the left, clutch teeth 28—*a* will be caused to engage clutch teeth 26—*b*, thus causing sun pinion 26 to revolve with planet plate 32.

Within tube 30 is a rod 31 in which is drilled a hole 31—*a*. Corresponding holes are drilled in clutch 29 and a pin 50 is pressed into this clutch, passing through slots 32—*d* in the hub of planet plate 32, and through the hole 31—*a*. Clutch 29 is provided with clutch teeth 29—*a*, and sun gear 27 is provided with clutch teeth 27—*a*. When rod 31 is moved to the right, it causes clutch 29 to move with it, so that clutch teeth 29—*a* and 27—*a* are engaged, and sun gear 27 is driven by planet plate 32.

If both clutches are disengaged, as shown in Fig. 2, planet plate 32 will revolve freely while sun gear 27 and sun pinion 26 will not revolve. If clutch 29 be engaged with planet gear 27, planet gear 27 will revolve with planet plate 32, driving the planet carrier, composed of gear 19, studs 19—*a*, and member 20, in the same direction as planet plate 32, but at a relatively low speed. If, instead, clutch 28 be moved into engagement with sun pinion 26, planet gear 21 will be made to revolve, driving the planet carrier at a still lower speed. If, however, both clutches are engaged simultaneously, the planet carrier will be compelled to rotate at the same rate of speed as planet plate 32.

When clutch 28 is engaged with pinion 26 or clutch 29 is engaged with gear 27, it is necessary, in order to drive gear 19 against appreciable resistance to insert the poppet which prevents ring gear 25 from turning, or it will turn instead of gear 19. If both clutches 28 and 29 are engaged with their respective sun pinion and gear, the poppet must be pulled out and ring gear 25 allowed to turn, or the mechanism will be locked, and cannot be turned. Tube 30 and rod 31 are shifted axially in order to engage and disengage the clutches 28 and 29 by any convenient mechanism. Such a mechanism is illustrated and described in co-pending application 669,581.

Fixed in planet plate 32 are three studs 33 and three studs 34. On each of the three studs 34 is a planet gear 35, free to rotate on the stud. On each of the studs 33 is a planet gear 37, on the extended hub of which are cut teeth 37—*a* to form a planet pinion. Meshing with the three planet gears 35 is a sun gear 36, on the extended hub of which are cut teeth 36—*a* to form a sun pinion. The teeth 36—*a* mesh with the teeth of the three planet gears 37, so that when the sun gear 36 is caused to revolve, the three planet gears 35 and the three planet gears 37 are also caused to revolve.

Meshing with the three planet gears 35 is an internal gear 38 which is a running fit in bore 1—*c* of case 1. Meshing with the three planet gears 37 is a second internal gear 39, also a running fit in bore 1—*c*. Meshing with the teeth 37—*a*, which form three planet pinions, is a third internal gear 40 which is also a running fit in bore 1—*c*. Sun gear 36 is keyed to shaft 41 which is free to turn in ball bearings 42 and 43. The outer race of ball bearing 42 is fitted to a bored hole in frame 44 which is bolted to case 1. The outer race of bearings 43 (shown in Fig. 1) is fitted in a bored hole in member 45, which in turn is bolted to frame 44. Member 45 forms the end bell of a motor, of which the rotor 46 is keyed to shaft 41, and the stator 47 is fast in frame 44. When the rotor revolves, sun gear 36 also revolves, causing planet pinions 35 and planet gears 37 to revolve. If there is resistance to the rotation of planet plate 32, the three rings 38, 39 and 40 will then revolve in the bore 1—*c* of case 1. These rings are provided with holes, or notches, in their rims, in the manner described in co-pending application 669,581, so that a poppet may be inserted through any one of three holes in case 1, to engage one of the holes in the rim of the corresponding internal gear.

It will be noted that all the gears associated with planet plates 19 and 32 are also coaxial with bore 1—*c*, or else their axes described circular paths about this axis, generating circular cylinders.

If the left-hand ring 38 is prevented from revolving, the other two rings will revolve and planet plate 32 will be driven by the three studs 34. If ring 39 is prevented from revolving, rings 38 and 40 will revolve while planet plate 32 will be driven by three studs 33. If ring 40 is prevented from revolving, rings 38 and 39 will revolve while planet plate 32 will be driven by means of the three studs 33 and compound planet pinions, consisting of planet gears 37 and planet pinions 37—*a*. Thus, three different speeds are available, depending on which of the three rings 38, 39 or 40, is prevented from revolving. Since planet plate 32 will revolve at any one of three speeds, depending on which of the three rings 38, 39 or 40, is prevented from revolving and since the planet carrier driven by the planet plate 32 may revolve at any one of three speeds, depending on whether clutch 28, clutch 29, or both clutches 28 and 29 are engaged, gear 19 is capable of any one of nine different speeds.

In Fig. 4 is shown another embodiment of my invention in which 101 is a body or case, 102 is a hollow spindle mounted near the nose in a pair of preloaded taper roller bearings 103 which fit in a counterbore in quill 104, and are clamped in place by flange 105, bolted to the quill. Nut 106 threaded to the spindle adjusts the preloading. Concentric with the quill and spindle is hollow cylinder 107 attached by its flange to case 101.

Within the hollow cylinder 107 rotates hollow driving shaft 108 which drives the spindle by two integral keys 108—*a* which engage keyways machined in spindle 102 extending from nut 106 to the right hand end of the spindle. The hollow shaft 108 turns in two preloaded antifriction bearings 109 and 110, the preloading being applied by nut 112. The exterior of quill 104 is a snug sliding fit in the bore of case 101, the exterior of hollow cylinder 107 is a snug sliding fit in the bore of the quill 104, and the right hand end of the spindle 102 is also a snug sliding fit in the bore of hollow shaft 108, so that as the quill and spindle are moved to the left by means not shown, all parts remain concentric and the right hand end of the spindle is steadied and guided. Because of the fact that the polar moment of inertia of the hollow shaft is much greater than that of the spindle, the torsional deflection of the spindle is greatly reduced.

Bolted to flange 108—*b* of the hollow shaft is a cup shaped internal gear 108—*c*, which revolves freely within the enlarged portion 101—*a* of the case. Within this gear is a carrier 119 which rotates on two ball bearings 111 and 112. Within the carrier, lying at the same radial distance from the axis and spaced 120 degrees apart, are revolvably mounted three shafts 113, each turning on two ball bearings, 113—a.

On each shaft is fixed a cluster gear 114, having two sets of teeth, one set being 114—a which engages with the teeth of internal gear 108—c, and the other set 114—b which engages with the teeth of an internal gear 116 which is fast to case 101. The internal gear 108—c has a less number of teeth than the internal gear 116 and the number of teeth in the right hand part of the cluster gear 114—b is greater than the number in the left hand part 114—a.

Bolted to the case 101 is frame 144, in which is mounted the stator 147 of an electric motor. Bolted to frame 144 is member 145. Turning in ball bearings is a hollow shaft 141, on which is fast rotor 146. The shaft is mounted in bearing 148 near the left hand end and in bearing 143 at its right hand end. Ball bearing 112 which acts as a steady bearing for carrier 119, is mounted on the shaft 141 as shown.

Integral with shaft 141 is cut pinion 141—a, which meshes with all three sets of gear teeth 114—b. Rotation of the shaft causes rotation of the cluster gears 114, and also of the carrier 119. If internal gears 108—c and 116 had the same number of teeth and both parts of each cluster gear 114 had the same number of teeth, nothing but the carrier and the cluster gears would revolve when shaft 141 turned. However, because of the slight difference in the numbers of teeth in the two internal gears and of the two parts of the cluster gears, a rapid rotation of shaft 141 produces a slow rotation of internal gear 108—c in the same direction, in a manner well known in the art.

It will be noted that all of the gears in the above described milling head have axes concentric with the spindle axis or else their axes describe circular paths about the spindle axis.

By this means, any desired ratio of speed reduction between the motor and the spindle, may be obtained with a corresponding increase in the torque. Because of this peculiar construction, pure torque is transmitted from the rotor to the spindle, and none of the bearings are subjected to excessive loads.

Bolted to the member 145, which is in effect the end bell of the motor, is bushed flange 145—a. Through the bush projects draw bolt 115, which is used to secure the shank of a milling cutter or arbor in the tapered hole in the nose of the spindle. Where this bolt passes through the spindle, it has a small clearance so that it may be readily turned. At the right hand end of the spindle, the draw bolt is enlarged in diameter, forming a shoulder at 115—a, which abuts against the end of the spindle, so that when the bolt is tightened, the spindle is in effect clamped between the shoulder of the bolt and the taper of the arbor. A liberal clearance is provided between the outside of draw bolt 115 and the bore of shaft 141.

It is apparent that my invention may be embodied in many forms without departing from the principles disclosed, and I therefore claim as my invention:

1. In a machine tool, a spindle slidable axially, a first hollow shaft rotatably mounted concentric therewith and slidably keyed thereto, reduction gearing concentric with the spindle and adapted to rotate the first hollow shaft comprising gears concentric with the spindle and other gears the axes of which are adapted to describe circular paths about the axis of the spindle, an electric motor concentric with the spindle, and a second hollow shaft fast to the rotating member of the electric motor, and concentric with and adapted to drive the reduction gearing.

2. In a machine tool, a spindle slidable axially, driving means for rotating the spindle, reduction gearing for rotating the driving means comprising gears concentric with the spindle and other gears the axes of which are adapted to describe circular paths about the axis of the spindle, and an electric motor having a hollow shaft concentric with the spindle, adapted to drive the reduction gearing.

3. In a machine tool, a spindle, driving means for rotating the spindle, reduction gearing concentric with the spindle for rotating the driving means comprising gears concentric with the spindle and other gears the axes of which are adapted to describe circular paths about the axis of the spindle, and an electric motor having a hollow shaft concentric with the spindle, adapted to drive the reduction gearing.

4. In a machine tool, a hollow spindle, means for rotating the spindle, reduction gearing concentric with the hollow spindle for driving the means for rotating the spindle comprising gears concentric with the spindle and other gears the axes of which are adapted to describe circular paths about the axis of the spindle, an electric motor having a hollow shaft concentric with the spindle, and a drawbolt passing through the hollow shaft of the electric motor and through the spindle.

5. In a machine tool, a hollow spindle, means for rotating the spindle, reduction gearing concentric with the hollow spindle for driving the means for rotating the spindle comprising gears concentric with the spindle and other gears, the axes of which are adapted to describe a circular path about the axis of the spindle, an electric motor having a hollow shaft concentric with the spindle, and a shouldered draw bolt concentric within the hollow motor shaft and the hollow spindle, and having the shoulder thereof abutting against a surface of the spindle normal to the spindle axis.

6. In a machine tool, a spindle, means for rotating the spindle, a first internal gear fast to the means for rotating the spindle, a second fixed internal gear, a cluster gear having two sets of teeth, one set meshing with the first internal gear, the other set meshing with the second fixed internal gear, a carrier for the cluster gear, and toothed means for driving the cluster gear.

7. In a machine tool, a spindle, a hollow shaft rotatably mounted concentric therewith, slidably keyed thereto, and adapted to guide the inner end thereof, a first planetary gear set adapted to drive the hollow shaft, a second planetary gear set rotatably mounted concentric with and adapted to drive the first planetary gear set, and power means for driving the second planetary gear set.

8. In a machine tool, a case, a cylindrical quill slidable therein, a spindle journaled near its outer end in the quill and slidable therewith, a bearing support attached to the case and having a hollow cylindrical extension fitting in and supported by the bore of the quill, anti-friction bearings near each end of the bearing support, a hollow shaft rotatably mounted in the anti-friction bearings concentric with the spindle, slidably keyed thereto, and adapted to guide the inner end thereof, and power means adapted to drive the hollow shaft at a plurality of speeds.

9. In a machine tool, a spindle, a first internal gear adapted to rotate the spindle, a second fixed internal gear, a cluster gear having two sets of teeth, one set meshing with the first internal gear and the other set meshing with the second fixed internal gear, a carrier for the cluster gear, and toothed means for driving the cluster gear.

10. In a machine tool, a hollow spindle, a first internal gear adapted to rotate the spindle, a second fixed internal gear, a plurality of cluster gears each having two sets of teeth, one set meshing with the first internal gear the other set meshing with the fixed internal gear, a carrier for the cluster gears, hollow toothed means for driving the cluster gears and a shouldered drawbolt concentric with the hollow spindle and having a shoulder thereof abutting against a surface of the spindle normal to the spindle axis.

11. In a machine tool, a case, a cylindrical quill slidable therein, a bearing support attached to the case and having a cylindrical extension fitting the bore of the quill, a pair of anti-friction bearings one at each end of the bearing support, a spindle journaled near its outer end in the quill and a hollow shaft journaled in the anti-friction bearings and concentric with and adapted to drive the spindle.

12. In a machine tool, a case, a cylindrical quill slidable therein, a spindle journaled near its outer end in the quill, a bearing support attached to the case and having an extended cylindrical portion fitting in the bore of the quill, anti-friction bearings near either end of the bearing support, a hollow shaft rotatably mounted in the anti-friction bearings concentric with the spindle, slidably keyed thereto, and adapted to guide the inner end thereof, and power means adapted to drive the hollow shaft at a plurality of speeds.

13. In a machine tool, a case, a spindle slidable axially, a bearing support attached to the case, and having a hollow cylindrical extension, anti-friction bearings at either end of the bearing support, a hollow shaft rotatably mounted in the anti-friction bearings concentric with the spindle, slidably keyed thereto, and adapted to guide the inner end thereof, and power means for driving the hollow shaft at a plurality of speeds.

14. In a machine tool, a quill slidable axially, a spindle slidable axially with the quill, a hollow shaft rotatably mounted within the quill, slidably keyed to the spindle, and adapted to guide the inner end thereof, a pair of anti-friction bearings, one near either end of the hollow shaft, adapted to constrain the hollow shaft axially and laterally, and power means for rotating the hollow shaft.

15. In a machine tool, a quill slidable axially, a spindle slidable therewith, a hollow shaft rotatably mounted within the quill, slidably keyed to the spindle, and adapted to guide the inner end thereof, anti-friction bearings near either end of the hollow shaft and adapted to constrain the hollow shaft against axial or lateral movement, gearing for driving the hollow shaft at a plurality of speeds, and power means for driving the gearing.

JOHN M. WALTER.